United States Patent [19]

Fujita et al.

[11] Patent Number: 4,869,332

[45] Date of Patent: Sep. 26, 1989

[54] REVERSE DRIVE FOR SMALL VEHICLES

[75] Inventors: Haruyasu Fujita, Tokyo; Yoshiaki Hirosawa, Saitama; Kouichi Hikichi, Tokyo; Morio Sato, Kanagawa; Yoshiaki Hirakata, Tokyo; Toshifumi Ito, Saitama, all of Japan

[73] Assignee: Honda Giken Kogyo Kabushiki Kaisha, Tokyo, Japan

[21] Appl. No.: 923,359

[22] Filed: Oct. 27, 1986

[30] Foreign Application Priority Data

Oct. 25, 1985 [JP] Japan ............................... 60-238643
Dec. 26, 1985 [JP] Japan ............................... 60-295752

[51] Int. Cl.⁴ .............................................. B60K 1/00
[52] U.S. Cl. ..................................... 180/65.2; 180/220
[58] Field of Search ................... 180/70.1, 75.1, 65.2, 180/220; 280/3; 74/847

[56] References Cited

U.S. PATENT DOCUMENTS

| 799,851 | 9/1905 | Hood . | |
|---|---|---|---|
| 1,822,673 | 7/1929 | Schwenke . | |
| 1,992,210 | 2/1935 | Higley | 180/65.2 |
| 3,211,249 | 10/1965 | Papst | 180/65.2 |
| 4,188,834 | 2/1980 | Wakatsuki et al. . | |
| 4,347,813 | 9/1982 | Maucher et al. . | |
| 4,410,071 | 10/1983 | Osterman . | |
| 4,422,656 | 12/1983 | Kaplan et al. | 280/3 |
| 4,481,841 | 11/1984 | Abthoff et al. | 180/69.6 |
| 4,533,011 | 8/1985 | Heidemeyer et al. | 180/65.2 |
| 4,629,206 | 12/1986 | Omagari . | |
| 4,763,538 | 8/1988 | Fujita et al. . | |

FOREIGN PATENT DOCUMENTS 8406061-5 10/1985 Sweden .

Primary Examiner—Kenneth R. Rice
Attorney, Agent, or Firm—Lyon & Lyon

[57] ABSTRACT

A reverse drive for small vehicles in which an output shaft of a second motor, which is different from the internal combustion engine for running use, can be connected to the transmission line leading from the internal combustion engine to the rear wheel so as to rotate the rear wheel in reverse. The second motor is a starter motor capable of normal and reverse rotations, the normal rotation of the starter motor being transmitted to the internal combustion engine for driving use through a starting clutch, and the reverse rotation of said starter motor being transmitted to the power transmission line through a reverse clutch. Otherwise, the second motor may be a starter motor capable of rotating only in one direction. In this case, the output of the starter motor is transmitted to the output side of the power transmission line through a reverse transmission line while the output transmission line is interrupted.

21 Claims, 13 Drawing Sheets

| FIG.9A | FIG.9B |

REVERSE DRIVE FOR SMALL VEHICLES

BACKGROUND OF THE INVENTION

The field of the present invention is auxiliary drive mechanisms for small vehicles employed for reverse running of the vehicle.

Reverse drive mechanisms have long been available. Most conveniently on larger vehicles, the mechanism is driven by the principal source of power through a reverse gear in the transmission. It is less convenient to employ such a reverse drive in a smaller vehicle. A reverse drive mechanism, disclosed in Japanese Laid-open Patent Publication No. 155545/1984, is provided in a transmission system for transferring driving power from an internal combustion engine to the wheels of a small vehicle such as motorcycle.

In this mechanism reverse speed was limited by interrupting the spark discharge of the spark plug at a certain speed. However, since the internal combustion engine of the vehicle is used which has a range of stable running speeds well above the idling speed, the reduction ratio of the reverse mechanism should be high to obtain a low backing speed of the vehicle, preferably below 2 km per hour. For satisfying this requirement, large reduction gears are required. Such large reduction gears are not practical.

Another type of reverse drive mechanism for large motorcycles, described in Japanese Laid-open Publication No. 252079/1985 comprises an auxiliary retractable wheel which is connected to an electric motor by means of a reduction mechanism. This mechanism employs a separate auxiliary wheel. The driving force through the auxiliary wheel is resisted by the power transmission line from the internal combustion engine to the rear wheel which must rotate as the motorcycle is driven in reverse. Moreover, the auxiliary wheel contacts the road surface at a position laterally shifted from the line connecting the front and rear wheels, so that the auxiliary wheel is not efficient for pulling the front and rear wheels. Thus, certain disadvantages have existed with reverse mechanisms on small vehicles such as motorcycles.

SUMMARY OF THE INVENTION

The present invention is directed to an improved reverse drive mechanism for small vehicles which is of a practical size and does not require an auxiliary wheel. An output shaft of a motor, which is not the internal combustion engine for powering the vehicle, can be connected to the transmission line leading from the internal combustion engine to the rear wheel so as to rotate the rear wheel in reverse. Using this motor, the vehicle can be driven in reverse in the upright position.

The foregoing and other objects, features and advantages of the invention will be apparent from the following more particular description of the preferred embodiments of the invention as illustrated hereinafter.

BRIEF DESCRIPTION OF THE DRAWINGS

FIG. 7 to FIG. 13 show a fourth embodiment of the invention wherein

FIG. 7 is a back side view of a power-unit-housing of this embodiment,

FIG. 8 us a longitudinal sectional view taken along line VIII—VIII of FIG. 7,

FIG. 9 is an enlarged sectional view of the reverse system,

FIG. 10 is a developed view of the reverse drum,

FIG. 11 is a front view of an inhibiting element connected to the back-clutching device, FIG. 12 is a front view of the reverse arm, FIG. 13 is a perspective view of the reverse shifter.

DETAILED DESCRIPTION OF PREFERRED EMBODIMENTS

Figure 1:
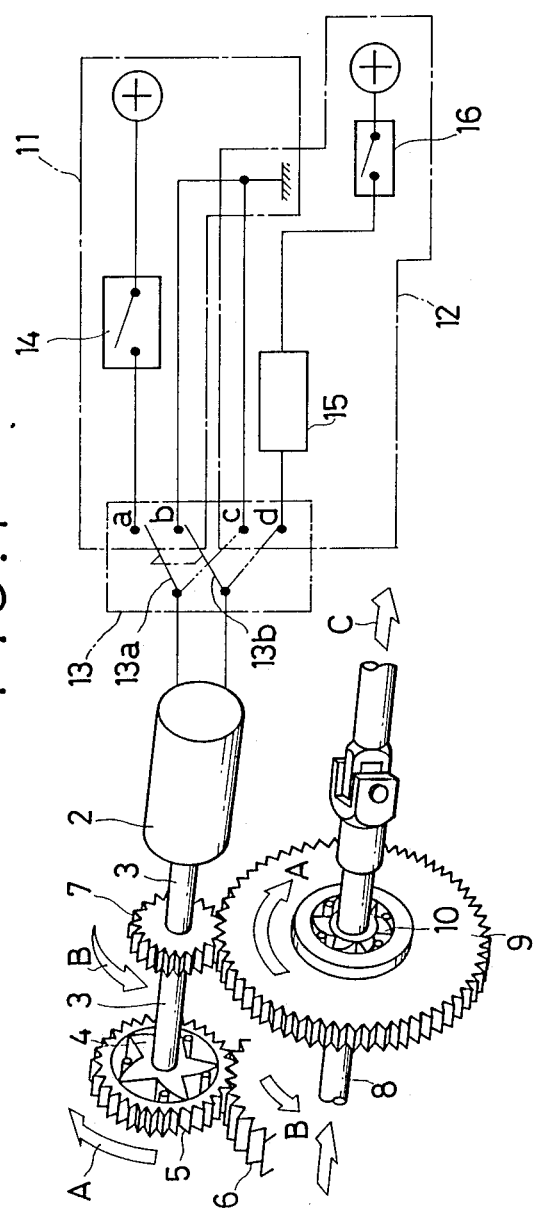
FIG. 1 is a schematic view of a first embodiment of a reverse drive mechanism according to the present invention. invention.
Figure 3:
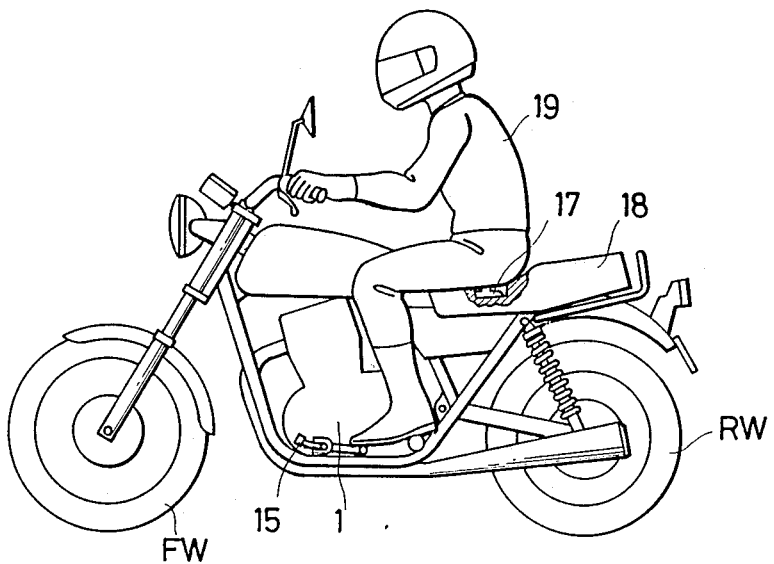
FIG. 3 is a side view of a motorcycle according to the present invention.

Now, an embodiment of the invention shown in FIGS. 1 and 3 is described hereinbelow.

The motorcycle shown has mounted therein an internal combustion engine 1. A starter-motor 2 capable of normal and reverse rotations as an auxiliary motor separate from said internal combustion engine 1 is provided in addition thereto. The output shaft 3 of said starter-motor 2 carries a one-way starter-clutch 4 which transmits torque in the starting direction A but not in the reverse direction B. The output shaft 3 also has fixed thereto a reverse pinion 7.

A starter-pinion 5 on the output side of the starter-clutch 4 is engaged with a driven gear 6 which may be integral with the crankshaft of the internal combustion engine 1.

A drive shaft 8 which is parallel to the output shaft 3 is detachably connected to the internal combustion engine 1 for running use by means of a clutch and reduction gears. A driven gear 9 for backing use is fitted on the drive shaft 8 by means of a reverse clutch 10. This driven gear 9 for reverse drive is engaged with the reverse pinion 7, so that the reversing motion of the starter-motor 2 may be transmitted to the drive shaft 8 only when the starter-motor 2 is reversed and the reverse pinion 7 is rotated in the direction B. This rotates the driven gear 9 for backing use in the direction A. The drive shaft 8 is connected to the rear wheel RW.

The power circuit for the starter-motor 2 comprises a starting circuit 11 and a reversing circuit 12 juxtaposed therewith. The starter-motor 2 is selectively connected to the starting circuit 11 and the reversing circuit 12 through a reverse switch 13.

The starting circuit 11 includes a starter switch 14 in the line connects a plus terminal and terminal a of the reverse switch 13, terminal b of the reverse switch 13 being grounded.

In the reversing circuit 12, a voltage regulator 15 and a transmission switch 16 are mounted in series in the line connecting the plus terminal and terminal d of the reverse switch 13, terminal c of the reverse switch 13 being grounded. The transmission switch 16 is "on" when the reduction gearing is in neutral.

Since the embodiment shown in FIG. 1 is designed as described above, when selectors 13a, 13b are connected respectively to terminal a, b as shown by solid lines and the starter switch 14 is "on", current flows from the plus terminal through the starter switch 14, the terminal a, the selector 13a, the starter-motor 2, the selector 13b and the terminal b. This results in the output shaft 3 rotating in the direction A while the driven gear 6 rotates in the direction B. This drives the internal combustion engine 1 for starting.

When selectors 13a, 13b are connected to terminal c, d as shown by dotted lines, the reduction gearing is in the neutral position and the transmission switch 16 is "on", current flows from the plus terminal through the transmission switch 16, the voltage regulator 15, the terminal d, the selector 13b, the starter-motor 2, the selector 13a and the terminal c. This results in rotation of the output shaft 3 in the reverse direction B which rotates driven gear 9 in the direction A, so that the rear wheel RW is driven in reverse to back up the motorcycle.

By controlling the voltage regulator 15 to regulate the voltage applied to the output shaft 3, the backing speed of the rear wheel RW can be regulated.

Figure 2:
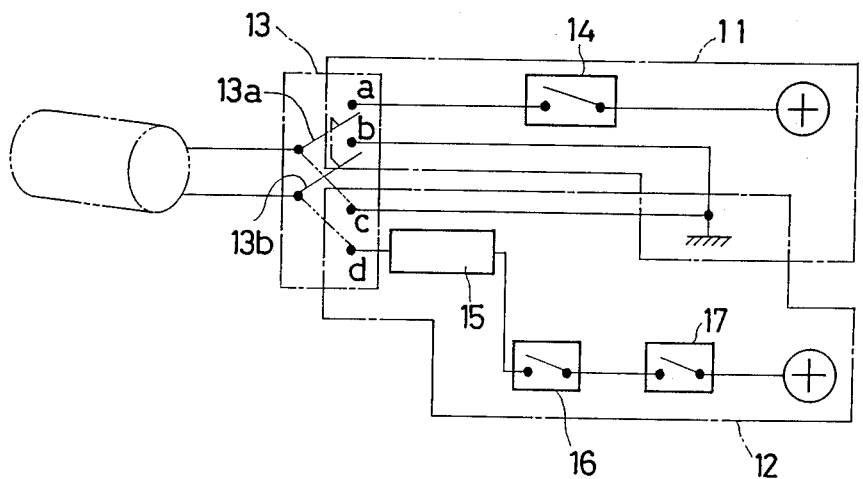
FIG. 2 is a schematic view of a second embodiment of a reverse drive mechanism according to the present invention.

In FIG. 2 and FIG. 3, a seat switch 17 is shown to be mounted in the line connecting the plus terminal of the DC source and terminal d of the reverse switch 13 in addition to the voltage regulator 15 and the transmission switch 16. This seat switch 17 may be mounted in the seat 18 to inhibit the speed of the motorcycle in reverse unless a rider 19 is sitting on the seat 18.

An embodiment according to the invention provided with further practical reverse speed regulators is described below.

Figure 4:
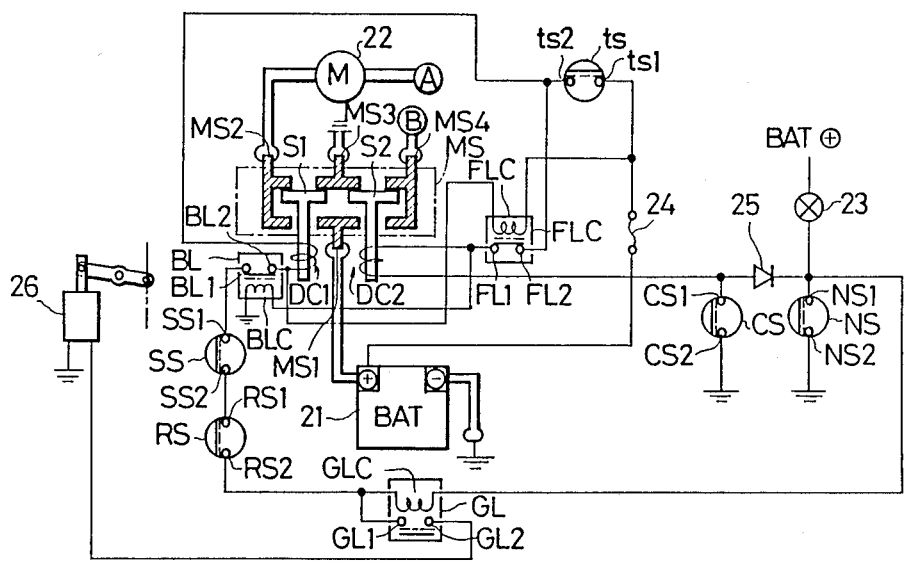
FIG. 4 is a circuit diagram showing a portion of a starter-motor driving circuit according to a third embodiment of the present invention.

FIG. 4 is a circuit diagram showing the motor driving circuit of the reverse apparatus in a motorcycle or the like according to another embodiment of the invention. In the drawing, a neutral switch NS puts contacts NS1, NS2 into a conductive state when the reduction gearing is in neutral. A clutch switch CS puts contacts CS1, CS2 into a conductive state when the clutch is disengaged. A starter switch as operated by drive puts contacts ts1, ts2 in their conductive state. The seat switch SS puts contacts SS1, SS2 into their conductive state when a rider sits on the seat. A reverse switch RS which is also operated by a rider puts contacts RS1, RS2 into their conductive state. A battery 21 mounted on motorcycle has its negative terminal grounded and its plus terminal connected to a terminal MS1 of a magnet switch MS. This magnet switch MS comprises four terminals MS1–MS4, movable contacts S1, S2 and coils DC1, DC2 for driving these contacts. The movable contact S1 puts the terminals MS2, MS3 into a conductive state while putting terminals MS1, MS2 into a non-conductive state when the coil DC1 is not energized. On the other hand, when the coil DC1 is energized, the movable contact S1 puts the terminals MS2, MS3 into a non-conductive state while putting the terminals MS1, MS2 into a conductive state. Further movable contact S2 puts terminals MS3, MS4 into conductive state while putting the terminals MS1, MS4 into a non-conductive state when the coil DC2 is not energized. On the other hand, when the coil DC2 is energized, the movable contact S2 puts the terminals MS3, MS4 into a non-conductive state while putting the terminals MS1, MS4 into a conductive state. The terminal MS2 is connected to one terminal 30a of a switching unit 30 shown in FIG. 5 through a cell motor 22, while another terminal 30b of the same switching unit 30 is connected to the terminal MS4 of the magnet switch MS. The terminal MS3 of the magnet switch MS is grounded.

The switching unit 30 becomes conductive when the potential of the terminal 30b is higher than that of the terminal 30a, while it becomes conductive or non-conductive according to the potential of gate terminal 30c when the potential of the terminal 30a is higher than that of the terminal 30b. More specifically, when the potential of the terminal 30a is higher than that of the terminal 30b, the switching unit 30 becomes conductive if the gate terminal 30c is grounded, while it becomes non-conductive if the gate terminal 30c is floating.

Further, concerning the conductive circuit of the cell motor 22, when the coil DC2 is energized and the coil DC1 is deenergized in the magnet switch MS, the terminals MS1 and MS4 on the one hand and the terminals MS2 and MS3 on the other hand are respectively conducted. Accordingly, the potential of the terminal 30b becomes higher than that of the terminal 30a in the switching unit 30, so that current flows from the battery 21 along the course: terminal MS1 - terminal MS4 - terminal 30b - terminal 30a - cell motor 22 - terminal MS2 - terminal MS3, whereby causing the cell motor 22 to rotate in the normal direction.

On the other hand, when the coil DC1 is energized and the coil DC2 is deenergized, the terminals MS1 and MS2 on the one hand and the terminals MS3 and MS4 on the other hand are respectively conducted. Consequently, the potential of the terminal 30a becomes higher than that of the terminal 30b in the switching unit 30, so that when the gate terminal 30c is grounded, current flows from the battery 21 along the course: terminal MS1 - terminal MS2 - cell motor 22 - terminal 30a - terminal 30b - terminal MS4 - terminal MS3. However, the gate terminal 30c is grounded intermittently, so that the switching unit 30 is put into the intermittent on-off state and the cell motor 22 is chopper-controlled. In other words, a stationary current is fed when the cell motor 22 is normally rotated, but when reversed, it is chopper-controlled by pulse current.

When the cell motor 22 is rotated normally, the output shaft 3 is rotated in the clockwise direction (arrow mark A) as shown in FIG. 1. Consequently, the starter pinion 5 provided with the one-way clutch is rotated to drive the driven gear 6 and to rotate the crankshaft (not shown) of the engine. On the other hand, when the cell motor 22 is reversed, the output shaft 3 rotates in the anti-clockwise direction (arrow B). Consequently, the reverse pinion 7 rotates to rotate the driven gear 9 and the drive shaft 8. Due to the rotation of this drive shaft 8, the rear wheel RW is reversed to drive the vehicle in reverse. The driven gear 9 is also provided with a one-way clutch 10.

Further, the driven gear 9 is so designed as to shift in the direction of arrow C and engage with the reverse pinion 7. As described above, the starter-motor 2 functions as the starter for the internal combustion engine 1 when rotating normally and functions as a power source for driving the vehicle backward when rotating in the reverse direction.

As shown in FIG. 4, the plus terminal of the battery 21 is connected to the contact NS1 of the neutral switch NS through a neutral indicator 23. The other contact NS2 of the neutral switch NS is grounded, with the result that, when the reduction gearing is in the neutral position, current flows through the neutral indicator 23 and the neutral switch NS to cause the lighting of the neutral indicator 23.

Further, the plus terminal of the battery 21 is connected to the contact ts1 of the starter switch ts through a fuse 24 while being connected to a normally closed contact BL2 of a relay BL through a coil FLC of a relay FL. The relay BL has the function of energizing the driving coil DC1 of the magnet switch MS to drive the movable contact S1. The normally closed contact BL2 is connected to the contact ts2 of the starter switch ts through the driving coil DC1. The coil BLC of the relay BL has one terminal grounded and the other terminal connected to the contact FL1 of the relay FL. Further, the contact BL1 of this relay BL is connected to a contact GL1 of a relay GL in series through the seat switch SS and the reverse switch RS and further is connected to a contact NS1 of the neutral switch NS through the coil GLC of the relay GL.

On the other hand, the relay FL has the function of energizing the driving coil DC2 of the magnet switch MS thereby driving the movable contact S2. The normally closed contact FL1 is connected to the contact CS1 of the clutch switch CS through the driving coil DC2, and further to the contact NS1 of the neutral switch NS through a diode 25. Another normally closed contact FL2 of this relay FL is connected to the contact ts1 of the starter switch ts.

Figure 5:
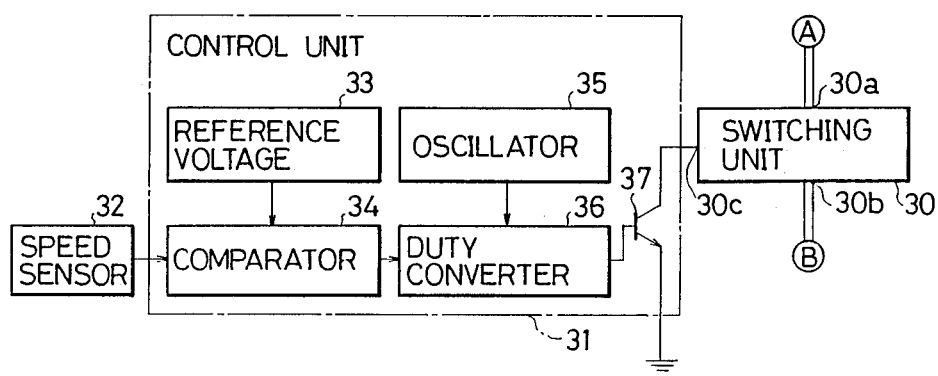
FIG. 5 is a block diagram of the starter-motor driving circuit shown in FIG. 4.

The relay GL is used for shifting of the driven gear 9, and has its contact GL2 grounded through a solenoid 26. This solenoid 26 is energized to shift the driven gear 9 in the direction C for engaging with the reverse pinion 7. Further, the contact CS2 of the clutch switch CS is grounded. Referring now to FIG. 5, a block diagram shows the essential portion of the motor driving circuit. As shown in this figure, a control unit 31 closes or opens a switching unit 30 on the basis of a signal from a speed sensor 32. The control unit thus controls the switching unit 30 to control in turn the rotation of the cell motor 22 by chopping for keeping the reverse speed at no more than a preselected level. More specifically, speed sensor 32 converts the rotational speed of the wheels into voltage signals corresponding thereto and feeds these signals to the control unit 31. In this case, the resulting voltage signals become higher when the rotational speed becomes higher. The control unit 31 comprises a reference voltage generator 33, a comparator 34, an oscillator 35, a duty converter 36 and a transistor 37. The signals generated by the speed sensor 32 are fed to the comparator 34, which compares these voltage signals and reference voltage fed from reference voltage generator 33, and the difference thereof as voltage (difference signal) is fed to the duty converter 36. The reference voltage fed from the reference voltage generator 33 is a preset value.

Further, it is also possible to detect the rotational speed of the motor and compare the actual rotational speed thus detected with the reference speed, thereby to drive the motor at an approximately constant speed regardless of the road surface condition for carrying out a constant backward moment.

The duty converter 36 is driven by determined periods of trigger signal fed from the oscillator 35 for generating pulse signals for every trigger signal. In this case, the duty converter 36 widens or narrows the width of the pulse signals on the basis of the difference signals fed from comparator 34. More specifically, the duty converter 36 generates pulse signals having a predetermined pulse width (reference pulse width) for the difference signal of 0, that is when voltage signals fed from speed sensor 32 are equal to the reference voltage fed from the reference voltage generator 33. For the positive values of difference signals, that is when the voltage signals are lower than the reference voltage, the duty converter 36 widens the pluse width of pulse signals generated in accordance with the positive values of difference signal, while narrowing the pulse width for a negative difference signal, that is when the voltage signals are higher than the reference voltage. The pulse signals thus generated are fed to the base of transistor 37 to set it in on-off mode. The collector of this transistor 37 is connected to the gate terminal 30c of said switch unit 30. For every pulse signal, the switching unit 30 becomes "on" for the time period of pulse width to feed current to cell motor 2.

Figure 6:
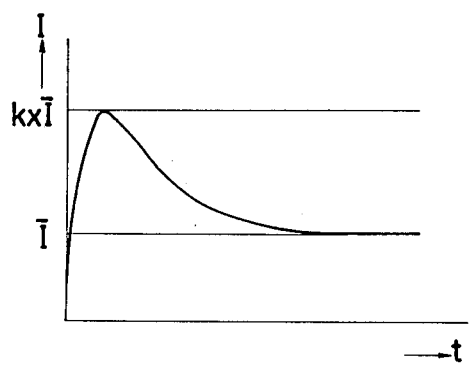
FIG. 6 is a graph showing the variation of average electric current with time when starting to drive in reverse in the motor.

The reference pulse width is determined such that a vehicle having for example 800kg of weight can run on a level road at the running speed of 1 km/h when the switching unit 30 is put into "on-off" mode by said reference pulse width (the speed in this case is referred to as "aimed speed"). If it is presumed that the average current "I" flows through the cell motor 2 when the switching unit 30 is on-off driven at reference pulse width, the duty converter 36 widens the pulse width to begin reversing so as to generate a current $K \times I$ (K:coefficient determined according to the torque characteristics of motor and the vehicle used). In other words, the duty converter 36 is so designed as to direct a larger current through the cell motor 2 temporarily at the beginning if reverse movement (refer to FIG. 6). A larger torque can thus be generated in cell motor 2 during the starting period.

The operation of the above back-driving apparatus will be set forth hereinbelow.

(1) Engine Start
(2) Reverse

When driving in reverse, the rider sits on the seat, and puts the reduction gearing in the neutral position, so that seatswitch SS and neutral switch NS respectively become "on", and puts the reverse switch RS in "on" position. Electric current flows thereby from the battery 21 through the fuse 24 - the coil FLC of relay FL - the contacts BL2 and BL1 of relay BL - the seat switch SS - the reverse switch RS - the coil GLC of relay GL - the neutral switch NS, so that relay FL is put "off" while relay GL is put "on" on. Consequently, the solenoid 26 is energized, and the driven gear 9 is shifted to engage the reverse pinion 7. Then, when the rider turns the start switch ts to the "on" position, electric current flows through the energizing coil DC1 to energize the latter coil. On the other hand, since the relay FL is in the "off" state, electric current does not flow through the energizing coil DC2. As a result, the terminals MS1, MS2 and the terminals MS3, MS4 become respectively conductive, and one terminal 30a of the switching unit 30 has a higher potential than that of the other terminal 30b. The gate terminal 30c of this switching unit 30 is grounded intermittently, so that pulse current is fed to the cell motor 2 to reverse the latter. This rotation is transmitted to the driveshaft 8 through the reverse pinion 7 and driven gear 9, thereby to reverse the rear wheel and back-drive the motorcycle.

The reverse speed is detected by the speed sensor 32 to be converted into a voltage signal, which is fed to the comparator 34. The comparator 34 compares this voltage signal and a reference voltage generated from the reference voltage generator 33. The difference of these signals is fed to the duty converter 36 as a differential signal. In this duty converter 36, a pulse signal is generated and fed out for every trigger signal fed from the oscillator 35. In this case, for positive values of the differential signal, that is when the voltage signals are lower than the reference potential, the pulse width is widened, while on the other hand, for negative values of the differential signal, that is when said voltage signal is higher than the reference potential, the pulse width is narrowed. This pulse width is equal to the conductive time period to the cell motor 2. Consequently, when the pulse width becomes larger, the average current to the cell motor becomes larger, while the average current to the cell motor 2 becomes smaller when the pulse width becomes narrower. In other words, when the running speed is lower than the aimed speed, the pulse width becomes large, so that the average current to the cell motor 2 becomes larger to increase the torque of the cell motor 2 and the rotative speed thereof. When the running speed becomes higher, pulse width becomes narrower, so that the average current to the cell motor 2 becomes lower and the torque thereof becomes lower to decrease the rotational speed. Running speed is thus decreased.

As described above, when the running speed becomes lower than the aimed speed, the rotative speed of cell motor 2 is increased, while on the other hand, the rotative speed becomes higher than the aimed speed, the rotive speed of the cell motor 2 becomes lower, so that the running speed is held constant regardless of a variation in load or a change in road conditions. In addition, the reference voltage width is deemed to be constant in this embodiment, but it can be varied by a setting operation so as to vary the aimed running speed in reverse.

Figure 7:
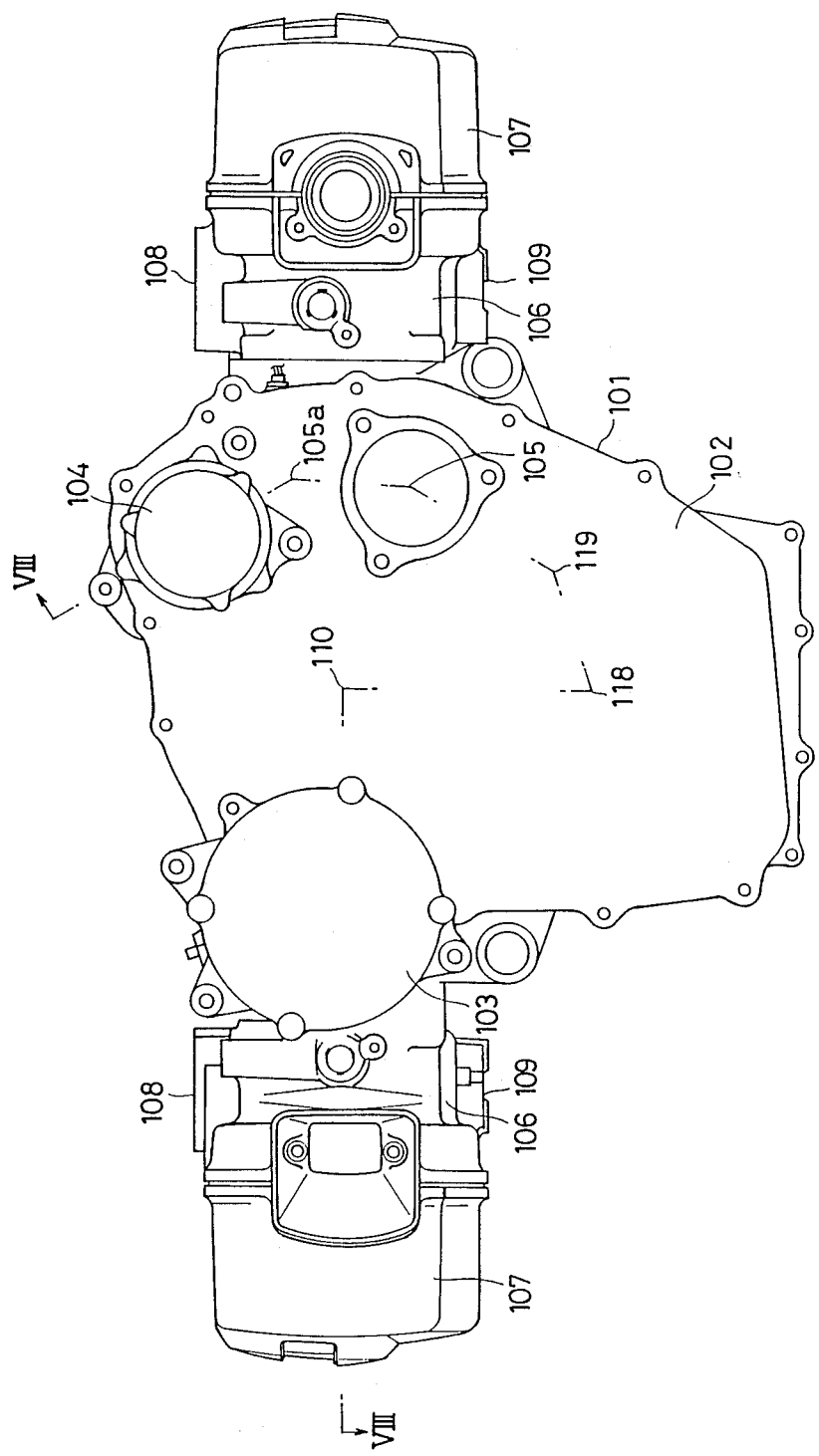
Figure 8:
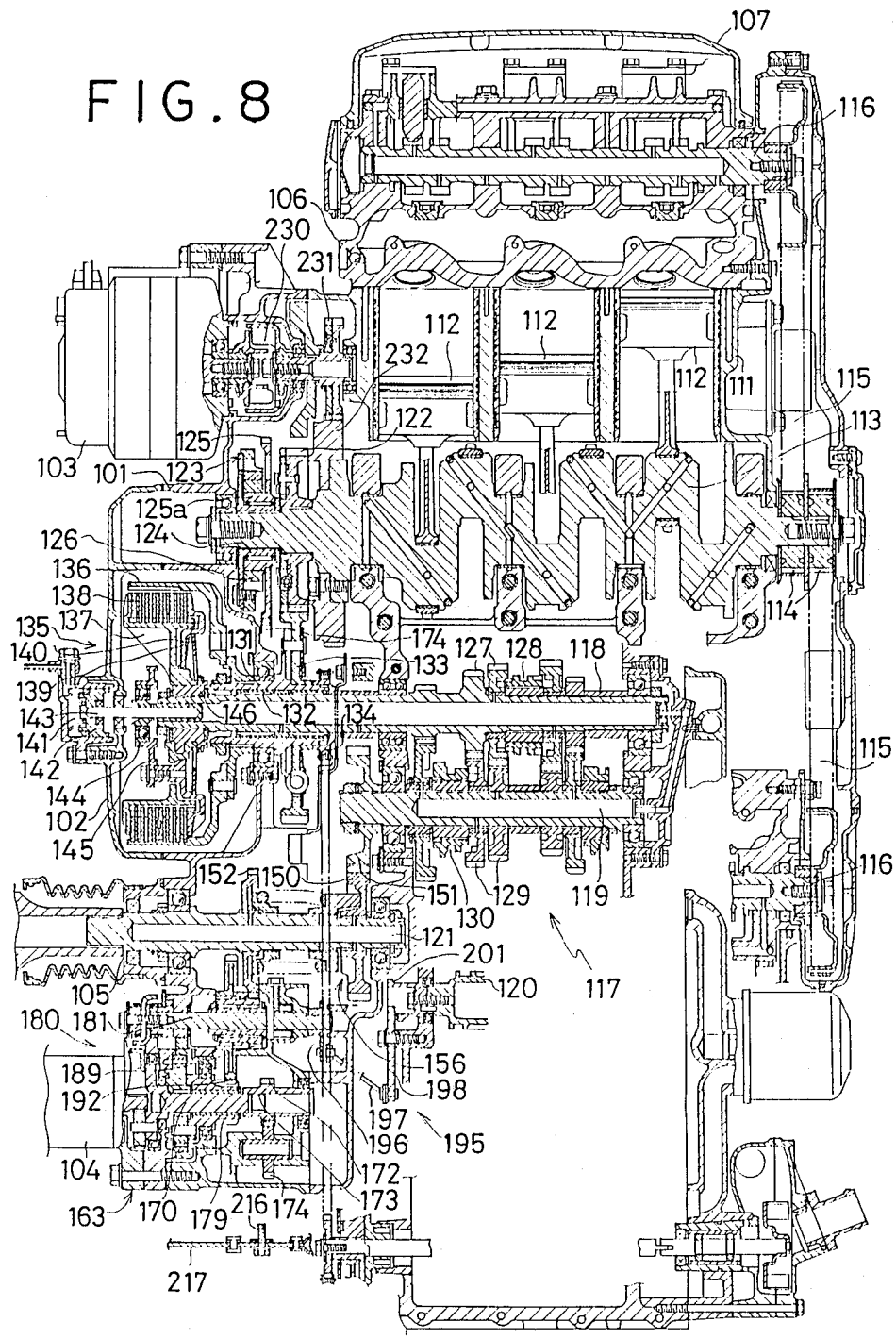

Now, the embodiments shown in FIG. 7–FIG. 14 will be described hereinbelow. FIG. 7 and FIG. 8 show respectively a schematic rear side view and a cross-sectional view taken along line VIII—VIII of FIG. 7 of a power unit comprising a horizontally confronted 6-cylinder type engine and a transmission gear box.

In FIG. 7, a housing 101 of the power unit, a clutch cover 102, an AC generator 103, a starter motor 104, an output shaft mounting hole 105, a center point 105a of reverse shaft, cylinder heads 106 and cylinder covers 107 connected respectively on both ends of said housing 101, inlet ports 108 of cylinder heads 106, outlet ports 109 and a center point 110 of a crankshaft are shown.

As shown in FIG. 8, a cylinder block 111 on one side has mounted therein three pistons 112, which are connected to the crankshaft 113. Two pulleys 114 drive camshafts 116 on both sides through timing belt 115.

Similarly to the heretofore known apparatus, a housing 101 supports a main shaft 118, a counter shaft 119, a shift drum 120 an an output shaft 121 of the transmission gear box 117. These shafts are respectively parallel to the crankshaft 113. The crankshaft 113 has fixed thereto on its left end an output gear 122 and a boss 124 of a one-way clutch 123 for starting use. The boss 124 carries loosely thereon a sleeve 125a which is integral with a starting input gear 125. A one-way transmission element 126 is interposed between a ring integral with the boss 124 and the sleeve 125a, thereby to drive the crankshaft 113 through the input gear 125, the transmission element 126 and the boss 124 on starting. After starting, the starting input gear 125 stops, but the crankshaft 113 continues to rotate due to the one-way clutch 123.

Similarly to the known apparatus, the main shaft 118 of the transmission gear box 117 is provided with reduction gears 127 and a clutch 128, and a counter shaft 119 is provided also with reduction gears 129 and a clutch 130. The main shaft 118 carries rotatably on its left end a clutch input sleeve 131 by means of a needle bearing 132. The clutch input sleeve 131 has fixed thereon a cluch input gear 133 and a sprocket 134 for driving the oil pump as well as an input element 136 of a main clutch 135.

The main clutch 135 consists of a number of friction plates 138 engaged with any one of the input element 136 and the output element 137. These plates 138 are arranged alternatively and pressed by a pressing plate 139 and a cup washer 140, in order to normally transmit the rotation transmitted from the gears 122, 133 and the sleeve 131 to the main shaft 118.

The clutch cover 102 is provided with a hydraulic cylinder 141 in order to press a piston 142, a rod 143, a bearing 144 and a release plate 145 to the righthand side. By feeding hydraulic pressure, the pressure plate 139 is caused to shift rightward to release the pressure of the friction plate 138. The output element 137 is fixed to the main shaft 118 by means of a boss 146.

Figures 9, 9A:
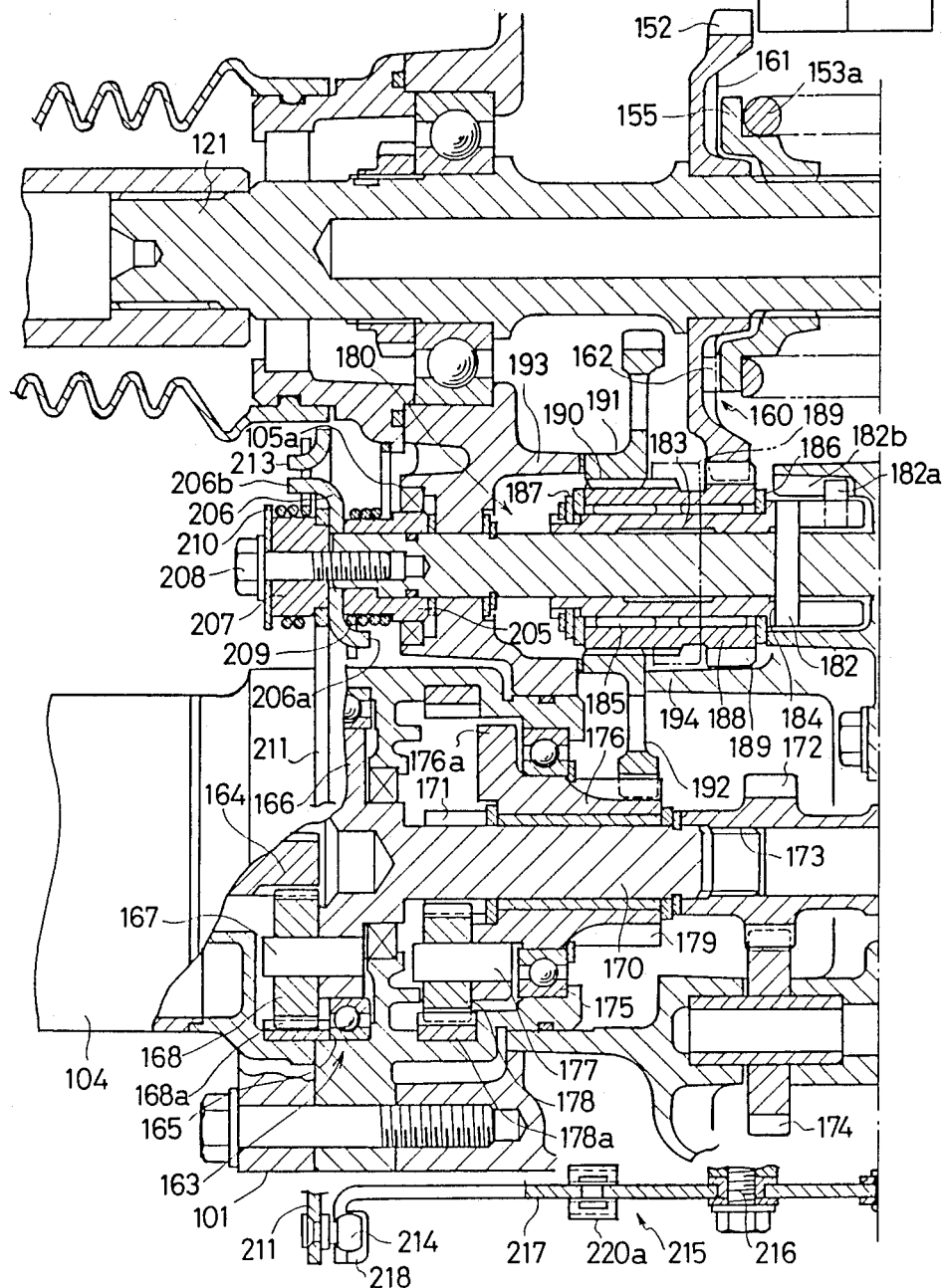
Figure 9B:
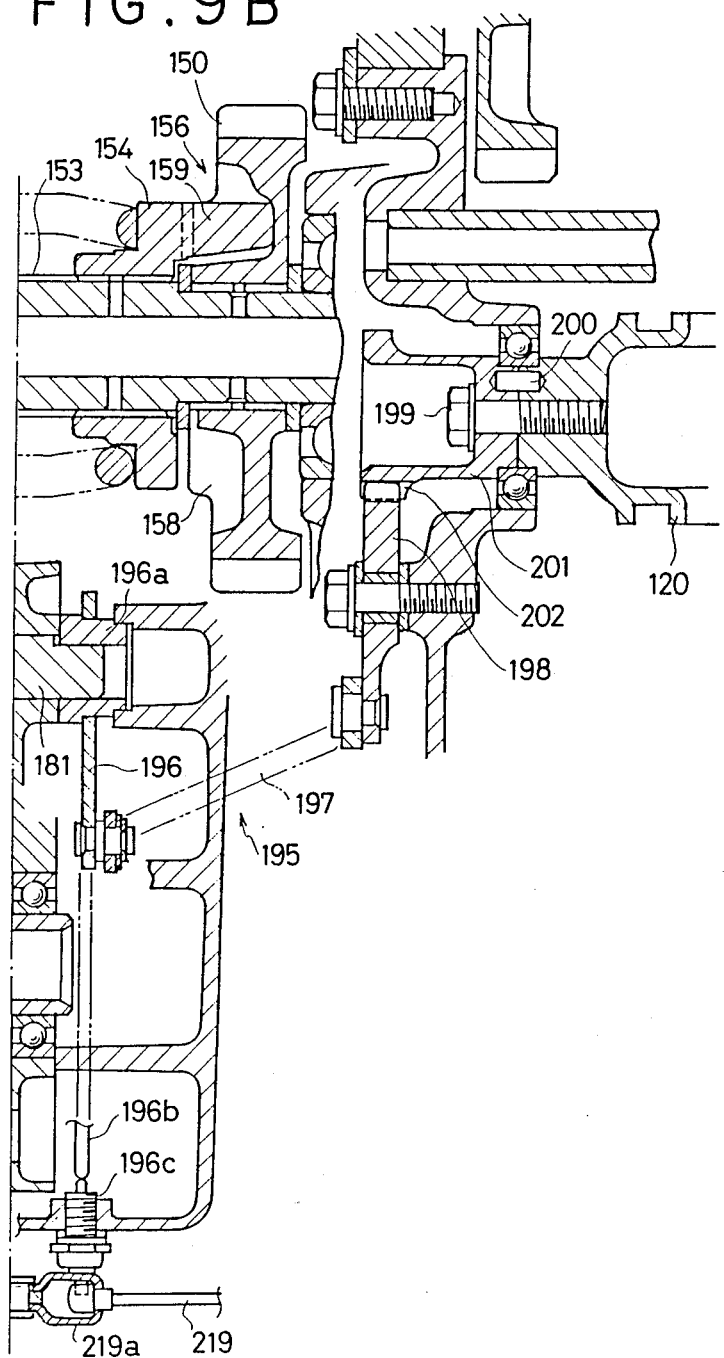

The output shaft 121 has at its right end a driven gear 150. This driven gear 150 is engaged with an output gear 151 fixed on the left end of the counter shaft 119. The output shaft 121 has further freely engaged thereon a reverse driven gear 152 which is driven in the backing operation. As shown in FIG. 9, a spline 153 of the output shaft 121 has engaged thereon sliders 154, 155 which are pressed on both sides by means of a compression spring 153a, thus forming a cam damper 156 by the driven gear 150 and the slider 154. The cam damper 156 consists of a concave-convex surface formed by projecting portions 158, 159 on the side surfaces of the gear 150 and the slider 154 respectively. When a load or reverse torque is applied as shocks, the projecting portion 159 shifts along the side surface of the other projecting portion 158 to cause the regression and relative rotation of the slider 154, thereby causing a damping effect.

Between the other reverse driven gear 152 and the slider 155, a torque limiter 160 is formed, which comprises curved surfaces 161, 162 formed respectively on the gear 152 and the slider 155 having the large and shallow slope.

As shown in FIG. 9, the output of the starting motor 104 is transmitted to two steps of planetary-type reduction gearing 163 to be reduced in each step, wherein the output of the first step is transmitted to the starting system while the output of the second step is transmitted to the reverse driving system.

The first step of planetary-type reduction gearing 163 comprises a sun gear 164 fixed to the rotational shaft of the starting motor 104, a planetary gear 168 carried by a pin 167 supported by a bearing 165 by means of a carrier 166, a ring gear 168a fixed to the housing and so on. A starting shaft 170 formed as the output side of the carrier 166 has a solar gear 171 of the second step and has connected thereto a starting gear 172 by means of a spline 173, the starting gear 172 driving the aforementioned starting gear 125 through an idler 174.

The second step of planetary-type reduction gearing comprising the sun gear 171, a hollow reverse output shaft 176 freely engaged with the starting shaft 170 and supported from outside by means of a bearing 175, a planetary gear 178 supported on a carrier 176a integral with the output shaft 176 by means of a pin 177, a ring gear 178a fixed to housing 101 for further reducing the rotative speed of the sun gear 173 reduced in the former or first step to transmit the reduced speed to reverse output shaft 176. A reverse motive gear 179 is cut out on this reverse output shaft 176.

Figure 10:
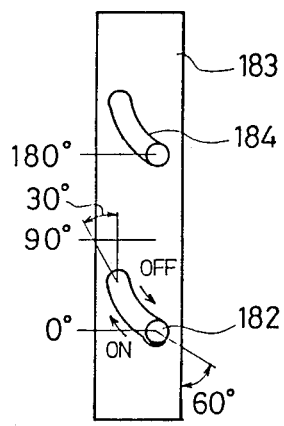

A back-driving clutch device 180 is provided between the starting shaft 170 and the final output shaft 121 for transmitting the rotation of the reverse motive gear 179 to the output shaft 121. This device 180 and the second step of the planetary-type reduction gearing 163 constitute the back-driving system, the device 180 driving the reverse driven gear 152. The device 180 comprises a reverse shaft 181, a pin 182 and a reverse drum 183 provided with a slant groove 184. The pin 182 and the slant groove 184 constitute a cam driving mechanism as shown in FIG. 10. Another pin 182a and housing groove 182b define a linear guide. Consequently, the reverse drum 183 shifts in the axial direction due to the rotation of reverse shaft 181. The drum 183 has thereon a sleeve 188 rotatably held by means of the needle bearing 185, and the rings 186 and 187. The sleeve 188 has a slide gear 189, a spline 190 cut out on its circumference and an interlocking gear 192 engaging with the spline 190. Accordingly, when the reverse shaft 181 is rotated, the reverse drum 183 shifts in the axial direction, and the slide gear 189 held thereby reciprocates into and out of engagement with the reverse driven gear 152 provided on the output shaft 121. In this case, the interlocking gear 192 is prevented from shifting by projections 193, 194 extending from the housing 101 and thus engages normally with the reverse motion gear 179 to continue its rotation, which causes the continuous rotation of the slide gear 189.

In order that the shift of the slide gear 189 to its engaging position by the reverse shaft 181 is limited to the neutral condition of the transmission gear box 117, an inhibiting device 195 is interposed between the reverse shaft 181 and the transmission gear box 171. As shown in FIG. 9, the reverse shaft 181 has fixed thereon a lever 196 at its boss portion 196a, and this lever 196 is connected to a pawl 198 through a link 197. A locker 201 fixed on shift drum 120 by screw 199 and pin 200 is provided with a recess 202, which the pawl 198 engages only when the shift drum 120 of the transmission gear box 117 is located in the neutral position. Only in this case, the slide gear 189 engages with the reverse auxiliary gear 152. For the purpose of displaying the reverse position, a cam 196b is connected to the lever 196, and a reverse switch 296c is fixed to the housing 101. Signals are transmitted to the indicator of meter panel through said switch.

A collar 205, a cross arm 206, and a collar 207 are fixed on the left side end of the reverse shaft 181 by a screw 208. A return spring 209 engages with the inner finger 206a of said cross arm 206. This affords rotational power to the reverse shaft 181, pressing the reverse drum 183 to its left side position. Another spring 210 is provided freely on the collar 207 and engages with both side surfaces of the outer finger 206b of the cross arm 206 as shown in FIG. 12.

Figure 13:
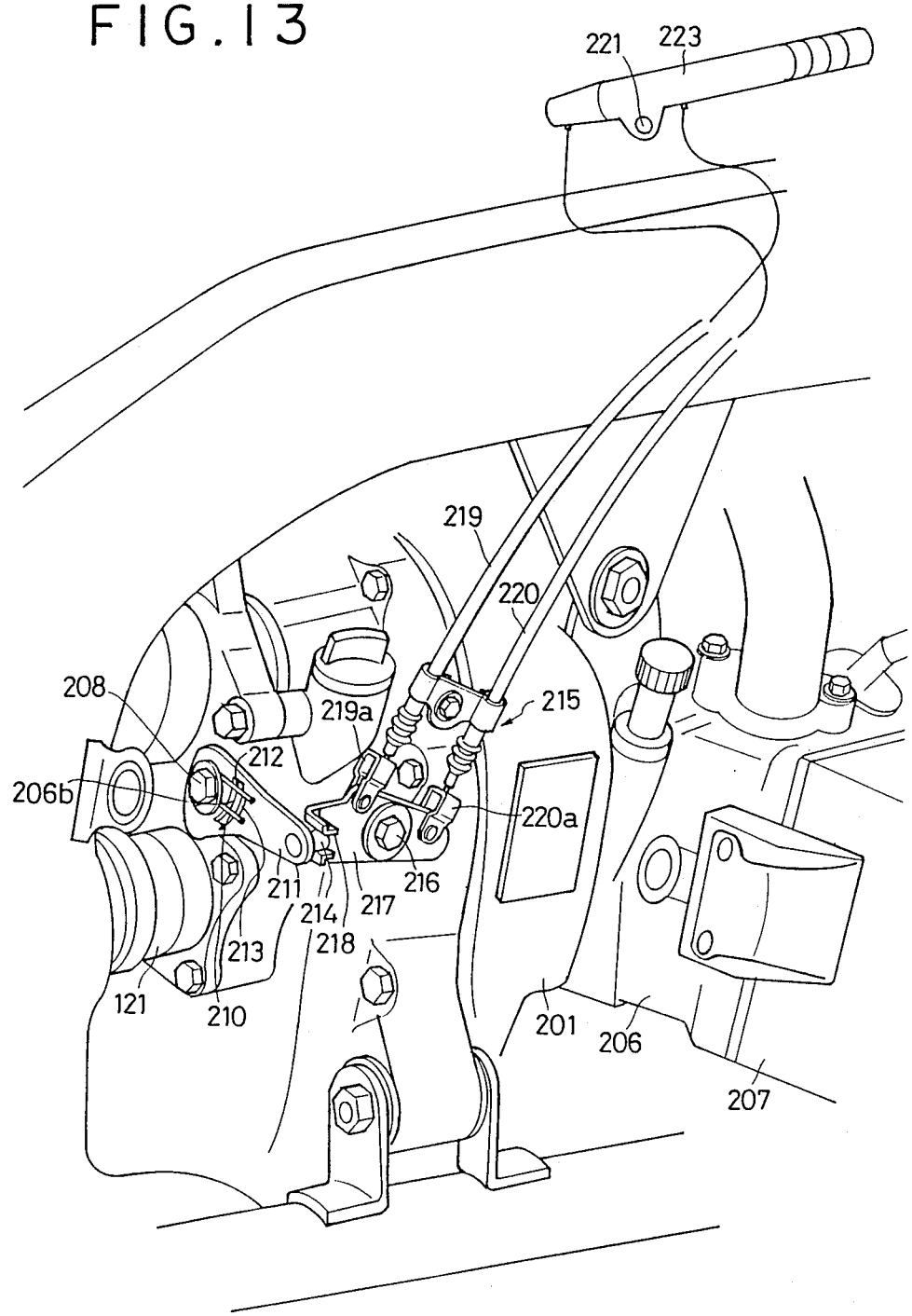
Figure 14:
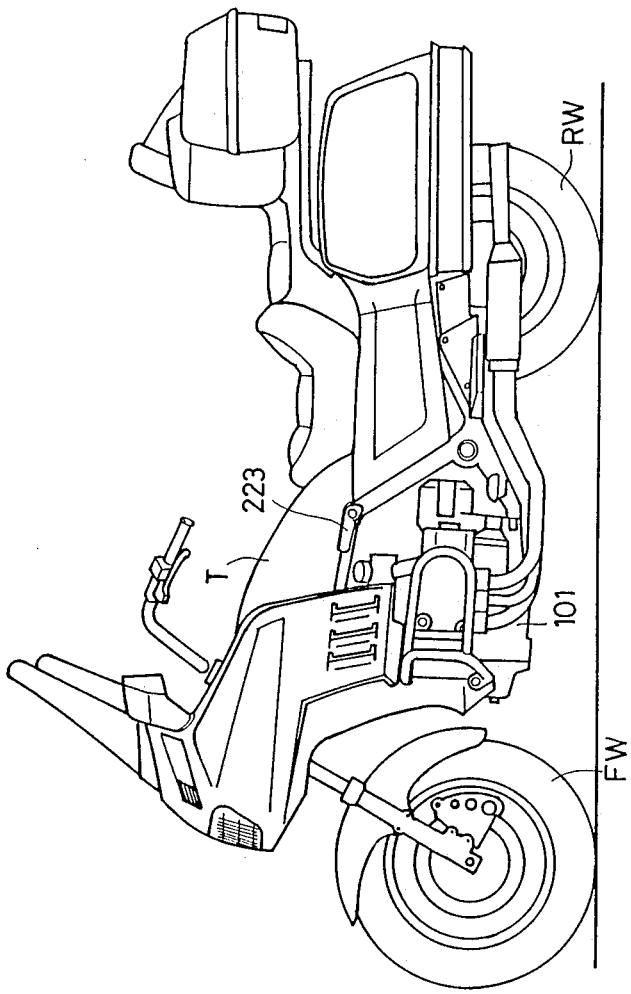
FIG. 14 is a side elevational view of a motorcycle having mounted therein the power unit shown in FIG. 7.

A reverse arm 211 is pivoted on the collar 207. The reverse arm 211 is provided with a window 212 and a plush finger 213. A finger 206b of the cross arm 206 projects through the window 212, and this finger 206b and the push finger 213 are pinched by two legs of the spring 207. The reverse arm 211 has fixed thereon a pivot 214 as shown in FIG. 13, to which a reverse shifter 215 is connected. The reverse shifter 215 comprises a lever 217 pivoted on the housing 101 by a pin 216 and pinching the pivot 214 by a pair of projections 218 thereof, cables 219, 220 connected to said lever 217 by connecting members 219a, 220a on both sides of pin 216, and a reverse handle 223 pivoted to the vehicle body by a pin 221 and connected with the respective other ends of said cables on both sides of the pin. The reverse handle 223 is located retractably in the lateral recessed portion of the body, for example below the fuel tank T, and is pulled out laterally and pulled upwards for reversing operation.

Figure 12:
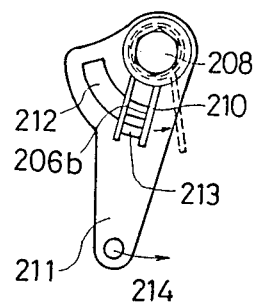
Figure 11:
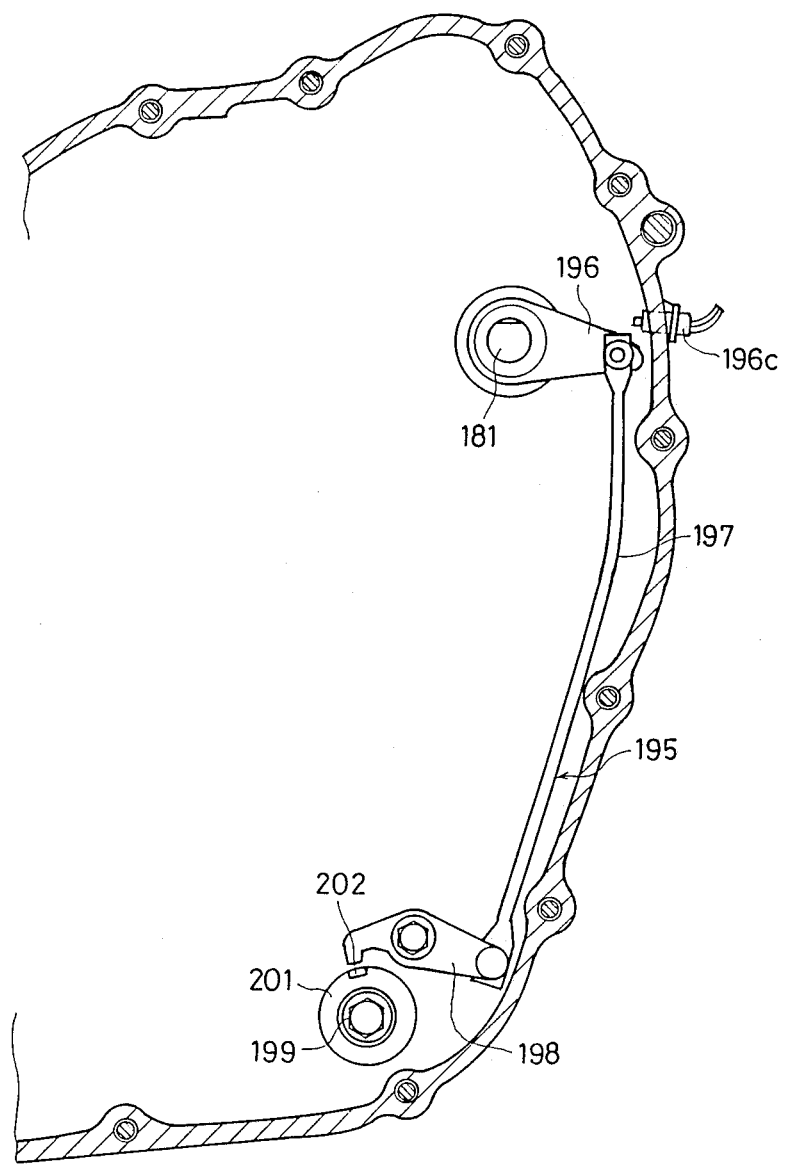

By rotating the reverse handle 223 on the reverse side, the reverse arm 211 is rotated in the direction of arrow 224 of FIG. 12 through lever 217 of the reverse shifter 215, whereby one leg of the spring 210 is rotated by the push finger 213 in the same direction and another leg of the spring 210 presses the finger 206b in the same direction. Therefore, the reverse shaft 181 is subjected to a rotational torque in the same direction through the cross arm 206.

When the transmission gear box 117 and consequently the shift drum 120 are located in the neutral position, the lever 196 is rotated by the reverse shaft 181, and the pawl 198 is put into the recess 202 of the locker 201 through the link 197 thereby to lock the shift drum 120 in the neutral position. At the same time, the reverse drum 183 has been advanced by the pin 182 and the slide gear 189 engages with the reverse driven gear 152 on the output shaft 121. By pushing the switch of the starting motor 104, the rotation thereof is reduced through two steps of the planetary-type reduction gear 163, and is additionally reduced through the combinations of reverse motion gear 179 - interlocking gear 192 and slide gear 189 - reverse driven gear 152, thereby to drive in reverse the output shaft 121 and consequently the rear wheel at low speed.

In this moment, the starting shaft 170 rotates also at low speed through the first step of the planetary-type reduction gear 163 thereby to rotate the starting input gear 125 provided on the crankshaft 113 through the starting gear 172 and the idler 174. However, the rotational speed thereof is about 550 rpm, while the idling rotational speed of the crankshaft 113 is about 800 rpm, so that the rotational interference of the starting system can be avoided due to the one-way clutch 123.

When the shift drum 120 is not located in the neutral position, the pawl 198 does not engage with the recess 202. In this case, when rotating the reverse handle 223, the reverse arm 211 is moved and presses the finger 206b through the spring 210, but the reverse shaft 181 of the clutch device 180 for driving in reverse does not rotate and the slide gear 189 cannot be shifted. When the shift drum 120 is shifted to the neutral position, it becomes possible to push out the reverse shaft 181 by the spring 210 for rotation and to engage the slide gear 189 with the gear 152.

When carrying out the normal starting of the above-described contruction, the main clutch 135 is cut, with the shift drum 120 in neutral position and the reverse handle 223 in a normal position. Consequently, the reverse shaft 181 has been rotated to its inactive position by the spring 210, where it is pressed and stopped by the return spring 209. By operating the starting motor 104 in this condition, rotational moment is transmitted from the reverse motive gear 179 of planetary-type reduction gear 163 to the interlocking gear 192, but the slide gear 189 is located in the left side position, so that the reverse driven gear 152 cannot be driven.

On the other hand, rotational moment is transmitted from the first step of planetary-type reduction gear through the starting shaft 170, the spline 173, the starting gear 172 and the idler 174 to the starting input gear 125, thereby to rotate the crankshaft 113 through the one-way clutch 123 to start the engine. After starting, forward running can be carried out by operating of the main clutch 135 and the shift drum 120.

When it is desired to drive the vehicle in reverse, it is first stopped, then transmission gear box 117 is located in the neutral position and the reverse handle 223 is rotated to the reverse position. The torque is transmitted from the lever 217, the reverse arm 211 and the spring 210 to the reverse shaft 181, further to the lever 196, the link 197 and the pawl 198 of the inhibiting device 195, so that the pawl 198 drops into the recess 202 of the locker 201 provided integrally on the shift drum 120, thereby to lock the shift drum in the neutral position and rotate the reverse shaft 181 by a predetermined angle. Consequently, the clutch device 180 for reverse is operated to move the drum 183 through the pin 184 and engage the slide gear 189 with the reverse driven gear 152. Then, by pushing the starting switch to activate the starting motor 104, low speed rotation reduced by two steps of planetary-type reduction gear 163 is transmitted as reverse rotation through the reverse motive gear 179, the interlocking gear 192, the slide gear 189, the reverse driven gear 152 and the torque limiter 160 up to the output shaft (121), thereby to drive the vehicle in reverse.

It is to be noted that the AC generator 103 is normally driven by the crankshaft 113 through the elastic joint 230 and the gears 231, 232.

For rotating the rear wheel RW in reverse in the above-described embodiments, the connection between the internal combustion engine for running use 1 and the rear wheel RW is cut so as not to transmit the reverse rotation of the starter motor 2 to the internal combustion engine 1. Otherwise, a decompression device 51 can be mounted on the engine 50 as shown in FIG. 15.

Pressing members 54 are provided in a vertically movable manner above corresponding exhaust valves 52 of the engine 50 through locker arms 53. Solenoids 55 are arranged above respective pressing members 54. A reverse switch 56 is inserted in the circuit of said solenoids 55. By closing the reverse switch 56, the starter motor (not shown) is reversed and solenoids 55 enter into an operative state to overcome the elastic force of the springs 57 and press down the pressing members 54. Exhaust valves 52 are opened downwards thereby to impede the increase of pressure in the combustion chamber 58 of the engine 50, so that the engine 50 can be also driven along with rear wheel RW even if the output of starter motor is low.

Figure 15:
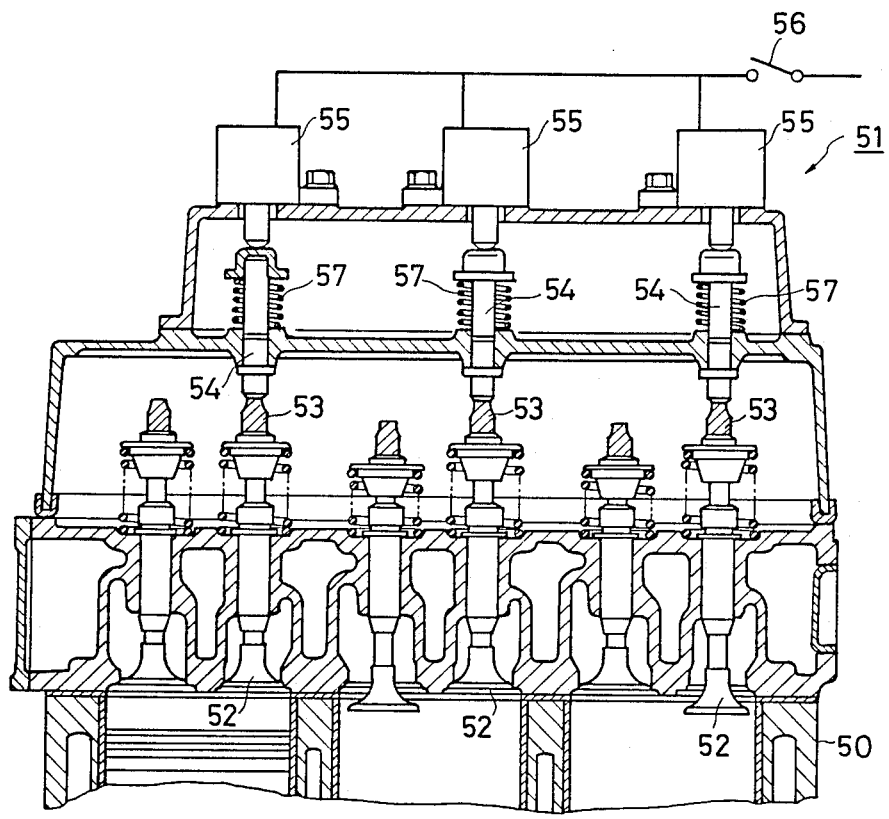
FIG. 15 is a longitudinal sectional view of a essential portion of the fifth embodiment of the present invention.

The embodiment shown in FIG. 15 need not have the means for detecting the interruption of the power transmission line, which simplifies remarkably the construction of the apparatus.

As described above, according to the invention, the rear wheel can be reversed at extremely low speeds by using the output of the second motor without using the power of the internal combustion engine for running. In addition thereto, there is no need of an auxiliary wheel, so that driving in reverse is very efficient and easy.

What is claimed is:

1. A reverse drive for motorcycles having a rear wheel and a case enclosing an internal combustion engine and a power transmission line that drivingly connects said engine and said rear wheel, said power transmission line including a crankshaft, a clutch, a speed change mechanism having a main shaft, a counter shaft and an output shaft, a second motor which is an electric motor having an output shaft, means selectively disconnecting said engine from said power transmission line, and means for selectively coupling said electric motor output shaft to said power transmission line intermediate said speed change mechanism output shaft and said rear wheel through a speed reduction mechanism and a clutch mechanism to rotate said rear wheel in reverse when said engine is disconnected therefrom.

2. The device according to claim 1, characterized in that a starter motor for starting the internal combustion engine is used as said second motor.

3. The device according to claim 2 characterized in that said starter motor is connected to a crankshaft of the internal combustion engine through a one-way clutch and to the power transmission line through a reduction gear mechanism and a clutch.

4. The device according to claim 1 characterized in that said electric motor, said speed reduction mechanism and said clutch mechanism are integrally contained in said case with said internal combustion engine and said power transmission line.

5. The device according to claim 1 which is characterized in that a reverse transmission line for transmitting the power of said second motor to the rear wheel so as to drive the rear wheel in reverse is interposed between said second motor and the output side of the power transmission line, and that an inhibiting device is provided which inhibits the connection of said reverse transmission line unless the power transmission line is interrupted.

6. The device according to claim 1 characterized by a reverse speed regulator for regulating the reverse rotational speed of the rear wheel in the state where the rear wheel is driven in the reverse direction by the rotation of said second motor which is an electric motor.

7. The device according to claim 1 characterized in that said electric motor is operable only when said clutch is disconnected or said speed change mechanism is placed in neutral.

8. The device according to claim 1 characterized in that a regulator is provided for controlling electric current supplied to said electric current to maintain the rotational speed thereof constant.

9. A reverse drive for motorcycles having a rear wheel, an internal combustion engine and a power transmission line drivingly connecting the engine and the rear wheel, comprising a starter motor, which is an electric motor having an output shaft, a starting clutch for transmitting the output of said starter motor to the power transmission line only for starting and a reverse clutch for transmitting the output of said second motor to the power transmission line only for rotating the rear wheel in reverse, said starting clutch and said reversing clutch being juxtaposed, means selectively disconnecting said engine from said power transmission line and means for selectively coupling said output shaft to said power transmission line to rotate said rear wheel in reverse when said engine is disconnected therefrom.

10. A reverse drive for motorcycles having a rear wheel, an internal combustion engine and a power transmission line drivingly connecting the engine and the rear wheel, comprising a second motor which is an electric motor having an output shaft, means selectively disconnecting said engine from said power transmission line, means for selectively coupling said output shaft to said power transmission line to rotate said rear wheel in reverse when said engine is disconnected therefrom, and a decompression device for reducing the pressure in the combustion chambers of the internal combustion engine for running use, said decompression device being in operation when the internal combustion engine and said starter motor are connected for driving said rear wheel in reverse.

11. A reverse drive for motorcycles having a rear wheel, an internal combustion engine and a power transmission line drivingly connecting the engine and rear wheel, comprising a starter motor which is an electric motor having an output shaft, means selectively disconnecting said engine from said power transmission line and means for selectively coupling said output shaft to said power transmission line to rotate said rear wheel in reverse when said engine is disconnected therefrom, a reverse speed regulator for regulating the reverse rotational speed of the rear wheel in the state where the rear wheel is driven in the reverse direction by the rotation of said starter motor by regulating the rotational speed of said starter motor to an output speed that is lower than that of said starter motor in starting said internal combustion engine.

12. A reverse drive for a small vehicle having a rear wheel, an internal combustion engine and a power transmission line for drivingly connecting said engine and said rear wheel, comprising an electric motor having an output shaft, means coupling said electric motor output shaft to said power transmission line for rotating said rear wheel in reverse, and a regulator operatively coupled to said electric motor during reverse operation of said rear wheel to reduce the output of said electric motor from the output thereof for starting said engine.

13. A reverse drive for a small vehicle having a rear wheel, an internal combustion engine and a power transmission line for drivingly connecting said engine and said rear wheel, comprising an electric motor having an output shaft, means coupling said electric motor output shaft to said power transmission line for selectively starting said engine or rotating said rear wheel in reverse; and a regulator operatively coupled to said electric motor during reverse operation of said rear wheel to reduce the output of said electric motor from the output thereof for starting said engine.

14. A reverse drive for a small vehicle having a rear wheel, an internal combustion engine and a power transmission line for drivingly connecting said engine and said rear wheel, comprising an electric motor having an output shaft, means coupling said electric motor output shaft to said power transmission line for selectively starting said engine or rotating said rear wheel in reverse; a decompression device for reducing the pressure in the combustion chambers of said internal combustion engine; and means for operating said decompression device when said rear wheel is rotated in reverse.

15. A reverse drive for a motorcycle having a rear wheel, an internal combustion engine and a power transmission line for drivingly connecting said engine and said rear wheel, comprising a second motor independent from said engine, said second motor having an output shaft rotatable at a substantially low speed; a reverse transmission line interposed between said output shaft and said power transmission line for transmitting power from said second motor to said rear wheel for reverse rotation thereof, means for operatively disconnecting said engine from said rear wheel; and an inhibiting device for preventing connection of said reverse transmission line to said power transmission line when said engine is operatively connected to said rear wheel.

16. A reverse drive for motorcycles having a rear wheel, an internal combustion engine and a power transmission line drivingly connecting the engine and the rear wheel, comprising a reversely operable electric motor having an output shaft, means for selectively disconnecting said engine from said power transmission line, means coupling said electric motor output shaft to said power transmission line for rotation in one direction for starting said internal combustion engine and for rotation in the other direction for rotating said rear wheel in reverse, said coupling means including a one-way starter clutch operable to limit the transmission of power between said output shaft and said power transmission line only in the direction for starting said internal combustion engine and a one-way reverse clutch operable to limit the transmission of power between said output shaft and said power transmission line only in the direction for rotating said rear wheel in reverse.

17. The device according to claim 16 in which said power transmission line includes a crankshaft from said engine and said starter clutch connects said second motor to said crankshaft, said second motor being further connected to said power transmission line through a reduction gear mechanism and said reversing clutch.

18. The device according to claim 17 including a reverse transmission line for transmitting power from said second motor to reverse drive said rear wheel is interposed between said second motor and the output side of said power transmission line, and means for inhibiting the connection of said reverse transmission line without interruption of said power transmission line.

19. The device according to claim 16 including a reverse speed regulator for regulating the reverse rotational speed of said rear wheel.

20. The device according to claim 19 in which said regulator regulates the rotational speed of said second motor in said other direction to be lower than that in said one direction.

21. The device according to claim 16 including decompression apparatus for reducing the pressure in the internal combustion engine combustion chambers when said second motor is operated to rotate said rear wheel in reverse.

* * * * *